United States Patent
Wigsten et al.

(10) Patent No.: US 6,955,621 B2
(45) Date of Patent: Oct. 18, 2005

(54) ROTARY ACTUATING HYDRAULIC TENSIONER

(75) Inventors: Mark MacDonald Wigsten, Lansing, NY (US); George L. Markley, Montour Falls, NY (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 09/843,325

(22) Filed: Apr. 26, 2001

(65) Prior Publication Data

US 2002/0160868 A1 Oct. 31, 2002

(51) Int. Cl.[7] .............................. F16H 7/08; F16H 7/18
(52) U.S. Cl. ........................ 474/110; 474/135; 474/111
(58) Field of Search ........................ 474/111, 140, 135, 474/109, 112, 110, 133, 136, 138, 122, 117; 23/90.31

(56) References Cited

U.S. PATENT DOCUMENTS

| | | | |
|---|---|---|---|
| 1,581,624 A | * | 4/1926 | Wunderlich et al. .......... 474/87 |
| 2,129,107 A | * | 9/1938 | Taylor ......................... 474/110 |
| 2,210,276 A | * | 8/1940 | Bremer ....................... 474/110 |
| 3,490,302 A | | 1/1970 | Turner et al. |
| 3,887,026 A | * | 6/1975 | Allison ....................... 180/425 |
| 4,177,689 A | * | 12/1979 | Zeilinger et al. ............. 474/87 |
| 4,299,583 A | | 11/1981 | Kraft et al. |
| 5,318,482 A | | 6/1994 | Sato et al. |
| 5,776,024 A | * | 7/1998 | White et al. ................. 474/110 |
| 5,967,921 A | | 10/1999 | Simpson et al. |
| 5,989,139 A | | 11/1999 | Dusinberre, II et al. |
| 6,322,470 B1 | * | 11/2001 | Markley et al. ............. 474/111 |

FOREIGN PATENT DOCUMENTS

| | | |
|---|---|---|
| DE | 196 50 289 | 6/1997 |
| DE | 197 13 824 | 10/1997 |
| DE | 198 02 886 | 7/1999 |
| GB | 861741 | * 2/1961 |
| JP | 59-208250 A | * 11/1984 |
| JP | 60-65945 A | * 4/1985 |
| WO | WO 00/34686 | 6/2000 |

OTHER PUBLICATIONS

International Search Report for Application No EP 02252836 dated Dec. 9, 2002.
European Search Report for Application No. 02 25 2836 dated Feb. 4, 2003.

* cited by examiner

*Primary Examiner*—Marcus Charles
(74) *Attorney, Agent, or Firm*—Fitch, Even, Tabin & Flannery; Greg Dziegielewski (57) ABSTRACT

An engine tensioning system including tensioner arms and a rotary actuating tensioner capable of driving multiple tensioner arms making multiple chain or belt contacts. The rotary actuating tensioner has connector pins fixed to a rotating surface to which tensioner arms are attached. Rotation of this surface is accomplished through a combination of springs and hydraulic pressure. When the surface rotates, the attached tensioner arms are driven laterally against the engine chain or belt, keeping it taut.

27 Claims, 7 Drawing Sheets

Prior Art

Fig. 13

ROTARY ACTUATING HYDRAULIC TENSIONER

FIELD OF THE INVENTION

The present invention relates generally, but not exclusively, to tensioners used with chain drives in automotive timing and power transmission applications. In particular, the present invention is related to a rotary actuating hydraulic tensioner which combines the benefits of typical hydraulic tensioners and the rotary motion of a torsion spring tensioner.

BACKGROUND OF THE INVENTION

Chain tensioning devices are used to control power transmission chains as the chain travels between a set of sprockets. Such chains usually have at least two separate strands, spans or lengths extending between the drive sprocket, such as a crankshaft sprocket, and the driven sprocket, such as a cam sprocket. The strand between the sprockets where the chain leaves the driven sprocket and enters the drive sprocket is frequently under tension as a result of the force imposed on the chain by the drive sprocket. The strand between the sprockets where the chain leaves the drive sprocket and enters the driven sprocket is frequently under reduced drive tension or slack due to the absence of driving force exerted on that strand. In systems with large center distances between the sprockets, both strands may evidence slack between the sprockets.

As a consequence, it is essential to the proper operation of the chain and sprocket system that a proper degree of engagement between the chain members and the sprockets is maintained during operation of the system. One aspect of maintaining such engagement of chain and sprocket is maintaining a proper degree of tension in the chain strands. The loss of chain tension can cause undesirable vibration and noise in the chain strands. The loss of chain tension also increases the possibility of chain slippage or unmeshing from the teeth of the sprocket, reducing engine efficiency and, in some instances, causing system failures. For example, it is especially important to prevent the chain from slipping in the case of a chain-driven camshaft in an internal combustion engine because misalignment of camshaft timing by several degrees can render the engine inoperative or cause damage to the engine.

The tension of the chain can vary due to wide variations in temperature and linear expansions among the various parts of an engine. Moreover, wear to the chain components during prolonged use also may produce a decrease in the chain tension. In addition, the intermittent stress placed on the chain devices in automotive applications due to variation in engine speed, engine load and other stress inducing occurrences can cause temporary and permanent chain tension.

To maintain tension in such transmission systems, tensioner devices have been used to push a tensioner arm against the chain along a chain strand. Such transmission systems typically press on the chain mechanically deflect the strand path imparting under the desired degree of tension on the chain. Current tensioner devices for performing this function, such as torsion spring tensioners, utilize the energy stored in a wound spring to drive the tensioner arm, such as shown in Ojima, U.S. Pat. No. 5,030,170. The small size of torsion spring tensioners makes them highly suitable in many situations. However, they often require an excessive spring load to effectively dampen chain vibrations and maintain a constant spring tension.

Hydraulic tensioner devices typically have a plunger slidably fitted into a chamber and biased outward by a spring to provide tension to the chain. Hydraulic pressure from an external source, such as an oil pump or the like, flows into the chamber through a check valve and passages formed in the housing of the device. The plunger may move outward against the chain, directly against a tensioner arm principally by an internal spring or similar structure and the plunger position is maintained in large part by hydraulic pressure within the housing. Such a hydraulic tensioner as used with a tensioner arm or shoe is shown in Simpson et al., U.S. Pat. No. 5,967,921.

Hydraulic tensioners frequently are preferred over torsion spring tensioners because they are much better at dampening chain movement and maintaining constant chain tension. For example, as a chain traverses its path, it may vibrate or "kick" causing the chain to push against the tensioner arm. The force of the kick is transferred to the tensioner device causing the hydraulic plunger to move in a reverse direction away from the chain. This reverse movement is resisted by the hydraulic fluid in the chamber, as flow of the fluid out of the chamber is restricted by the check valve assembly. In this fashion, the tensioner achieves a so-called no-return function, i.e., movements of the plunger are relatively easy in one direction (towards the chain) but difficult in the reverse direction. In addition, rack and ratchet assemblies also may be employed to provide a mechanical no-return function.

In some applications, however, the size and bulk of hydraulic tensioners can present difficulties in mounting and operating such tensioners where the available space, is better suited for torsion spring tensioners. To overcome the difficulty created by the size of hydraulic tensioners, lever systems have been employed that allow the mounting of the hydraulic tensioner at a distance from the chain assembly. Through the lever system, the hydraulic tensioner imparts pressure on one or more strands of the chain assembly thereby maintaining chain tension.

However, such lever mechanisms add to the complexity of the tensioner system and involve additional moving parts with a concomitant increase in maintenance expenses, problems and equipment failures. The use of such pivoted lever mechanisms may also diminish the ability of the hydraulic tensioners to dampen chain vibration. In addition, the mechanical limitations of the typical rod and piston design of hydraulic tensioners often limit the amount of slack which can be taken up by the tensioner during the life of the chain. One example of such a tensioner device is described in Sato et al., U.S. Pat. No. 5,318,482.

SUMMARY OF THE INVENTION

The rotary actuating tensioner of the invention provides a hydraulically actuated tensioner of reduced size, but with performance capabilities exceeding torsion spring tensioners. The rotary actuating tensioner of the invention requires less spring force than traditional torsion spring tensioners, eliminating the need for expensive tensioner wear face materials, reducing chain noise and potentially increasing the overall life of the tensioner parts and the reliability of the engine systems using the rotary actuating tensioner.

The rotary actuating tensioner is ideally suited for replacing hydraulic tensioner systems requiring levers with a more compact tensioner having similar or improved performance. The rotary actuating tensioners of the invention further may be installed at or near the pivot point of old tensioner arms to simplify the engine assembly, can reduce the space required for the tensioner, and can overcome the limitations inherent in tensioner configurations incorporating lever mechanisms.

In an alternative aspect, control of multiple chain strands may be achieved with the rotary actuating tensioner. By incorporating multiple pin assemblies on the face of the rotary actuating tensioner to act as connection points, a single rotary actuating tensioner can drive multiple tensioner arms contacting multiple chain strands (or making multiple contacts with a single strand). This configuration is advantageous as significantly increases the potential operating take-up of chain slack for a given range of tensioner operation.

By incorporating multiple contacts at different points, and opposing sides of a strand, the deviation of the chain from its original path also may be minimized to prevent potential interference of the mechanism with other engine components. Such a configuration also may minimize stress on the chain itself by limiting movement between the links as the chain traverses its path.

The use of the multiple strand contacts, in addition, may be used to enhance the dampening of the chain's movement. Vibrations which occur in one strand of chain will tend to be reduced or canceled when the energy of those vibrations are transferred to or combined with those in another strand through the rotating tensioner. Further, by taking up chain slack of both strands in an engine timing application, the present invention minimizes the chance for changes in the timing between the crankshaft and the camshaft as the chain wears and/or slackens.

In another aspect, the combination of multiple pin assemblies on a rotary surface provides the capability of imparting different degrees of movement in the tensioner arms attached to the pin assemblies. The degree of lateral movement imparted for a given rotational displacement is dependent upon the positioning of the pin assembly on the rotating surface. In other words, the degree of movement of the tensioner arm is a function of the radius formed between the pin assembly to which the tensioner arm is attached and the pivot point of the rotating surface. By varying the position of the pin assembly on the rotating surface, the degree of movement of tensioner arms can be altered for specific applications. For example, the tensioner arms of the invention may be positioned so they impart a different force to each chain strand for a given amount of rotation of the pin assemblies to compensate for differential strand tensions inherent in a system. In such a system, the separate chain strands may be placed under different degrees of tension depending upon whether the strand is being driven by a sprocket or is driving a sprocket.

In one aspect, the rotary actuating tensioner provides two interacting housings. The first, typically the main housing, is fixed to a stationary surface, e.g., an automotive engine block. The first housing forms a base through which the second housing, a rotary housing, develops torque that is ultimately transferred to the chain system as a linear force. This torque may be transferred directly or via a system of cantilevers to remove any developing slack from the chain.

The second, rotating housing sits within the main housing with a close and precisely controlled clearance between the housings. The two housings interact through a series of rigid wall sections which protrude from each housing into the cavity formed between the housings when the housings are joined. These protruding wall sections perform a variety of functions, such as an attachment point for tensioner springs that also are fixed to a wall section of the rotating housing. Thus, the rotation of one housing relative to the other will provide torsional resistance in the device and the spring recoil can be utilized to maintain chain tension.

The protruding wall sections also create chambers capable of holding pressurized hydraulic fluid. By incorporating fluid conduits into the design, complete with a flow-control mechanism to prevent back flow, such as a check-valve, filling these chambers with a hydraulic fluid will produce a piston-like effect. When opposing chamber walls are formed by the wall sections from the respective housings, pumping a hydraulic fluid into the chamber expands its volume by pressing against the chamber walls, rotating one housing relative to the other. This rotational motion can be translated into a linear force and utilized to maintain chain tension by pins and tensioner arms mounted on the rotating housing.

In another aspect, compressed springs are combined with the hydraulic fluid chambers to provide a tensioner with the tensioning capabilities of conventional hydraulic tensioner and the reduced size characteristics of torsion spring tensioners. In this aspect, when slack is present in an associated chain system, a reduction in resistance against the arms of the tensioner is transmitted to the rotary actuating tensioner. This reduction in resistance is countered by the internal spring mechanism of the system, which rotates rotary housing to impose force against the chain strands through tensioner arms, restoring the resistance. against the tensioner arms.

As the springs restore resistance to the system, the volume of the high pressure chambers within the tensioner is concurrently increased as the first housing rotates relative to the second housing. This increase in volume in turn actuates a flow of hydraulic fluid into the chamber to provide resistance to "kickback" against the tensioner by one or more chain strands.

In the rotating actuating tensioner of the invention, "kickback" forces from the chain are not countered solely by the spring mechanism, but by the hydraulic fluid filled the internal high pressure chambers. When a "kickback" occurs, the force imparted on the rotary tensioner acts to compress the hydraulic fluid and back flow out of the high pressure chamber holding the fluid is limited by a flow control mechanism (e.g., a check valve). The flow control dampens the force of the kickback on the system should the kickback force exceed typical loads, the hydraulic fluid is permitted to exit the tensioner between the first and second housings or through relief valves.

For similar reasons, the rotary tensioner of the invention reduces the tensioner spring force necessary to restore and maintain the proper chain tension in the system by the use of the hydraulic chambers. Thus, the rotary actuation reduces the need for the tension overload typical of conventional torsion tensioners, and further reduces the need for expensive tensioner wear-face materials and chain operating noise.

In another aspect, the rotary actuating tensioner of the invention permits the hydraulic fluid to lubricate the spring mechanism within the hydraulic fluid chamber, the fluid lubricates the spring mechanism, increasing its life and preventing corrosion. Similarly, a minimal clearance is required between the housings to allow them to rotate relative to each other, permitting the hydraulic fluid to seep into the movable joint between the housings, lubricating the entire mechanism.

In yet another aspect, the rotary actuating tensioner incorporates tensioner arms through which the rotary tensioner contacts the chain and maintains tension in the chain system. The tensioner arms come in a variety of designs and is generally located adjacent to one of the strands of the chain. Typically they are formed from an elongated piece of metal, routinely steel, which possesses a flat surface upon which a wear material or "shoe" can be mounted.

This aspect of the tensioner arm also incorporates at least one pivot joint through which the device communicates with the rotary actuating tensioner. Frequently the tensioner arm will possess a second pivot joint for attachment to a fixed mounting surface, such as an engine block. The pivot joints of the tensioner arm are formed by a hole with a cylindrical sleeve or bushing through which a pivot pin, shaft or bolt is inserted and about which the arm may rotate. The pivot pin also may be attached to an engine or mounting surface, a lever communicating with an actuating tensioner, or the tensioner device itself.

In another aspect, the rotary actuating tensioner drives several alternative tensioner arm configurations. One alternative is to mount multiple tensioner arms on a single hub. The arms are arranged to contact multiple chain strands, make multiple contacts with a single strand, or a combination of the two. The hub itself is fastened to the rotary actuating tensioner located centrally between the sprockets and chain strands. Rotation of the rotary actuating tensioner simultaneously drives all of the tensioner arms attached to the hub.

In another alternative aspect, a tensioner arm is mounted on a mounting pin centrally located between the sprockets and chain strands. The pin attachment forms a pivot joint and the hub assembly is driven by a lever attached to a rotary actuating tensioner mounted distally from the center line of the chain system.

In yet another aspect, the rotary tensioner is mounted along a slack chain path and provides tension to two chain contacts on the slack chain without the use of any lever system. With the rotary tensioner mounted beneath the chain, dual tensioner arms can be secured directly to the rotary housing. These dual arms extend in opposite directions from each other, roughly parallel to the chain path.

Each such arm has an attached shoe which contacts the chain. The shoe for one arm contacts the chain from the outside of the chain path and imparts tension by displacing the chain path toward the chain assembly center line. The shoe of the other arm contacts the chain on the inside of the chain path and imparts tension by deviating the chain path away from the centerline of the chain system. This orientation allows simple rotation of the rotary tensioner to maintain pressure on the chain at two points. Through the complementary placement of the chain contacts, chain path deviation is kept to a minimum.

In yet another aspect, the rotary actuating tensioner is centrally located relative to both the sprockets and the chain strands traversing between them. A separate tensioner arm is attached to each of two connection points on the rotary housing through pivot joints. One arm extends toward a slack strand, bearing a shoe which contacts the strand on the side opposite the centerline. The other arm extends toward a tight strand and bears a shoe which contacts the tight strand on the side opposite the centerline. Rotation of the rotary housing pulls the tensioner arms inwards, thereby creating tension by displacing the chain strands toward the centerline of the chain system.

In another aspect, a tensioner arm set parallel to the slack strand on the outside aspect of the chain assembly. One end of the arm is fixed to a stationary surface, such as an engine block, through a pivot joint. The other end of the arm is attached through a pivot joint to a lever. The lever in turn is attached through a pivot joint to a connecting pin of the rotary actuating tensioner. Through the lever and pivot joint mechanism, the rotary tensioner drives the shoe attached to the tensioner arm against the slack strand of the chain. This pressure deflects the slack strand toward the centerline of the chain system, thereby maintaining tension. The rotary tensioner may be mounted to either side of the arm assembly, as it is equally efficient "pushing" or "pulling" the tensioner arm against the chain. The rotary actuating tensioner also may be positioned such that the lever communicating between the tensioner and the tensioner arm is roughly perpendicular to the shoe face contacting the chain.

DETAILED DESCRIPTION OF THE INVENTION

Figure 1:
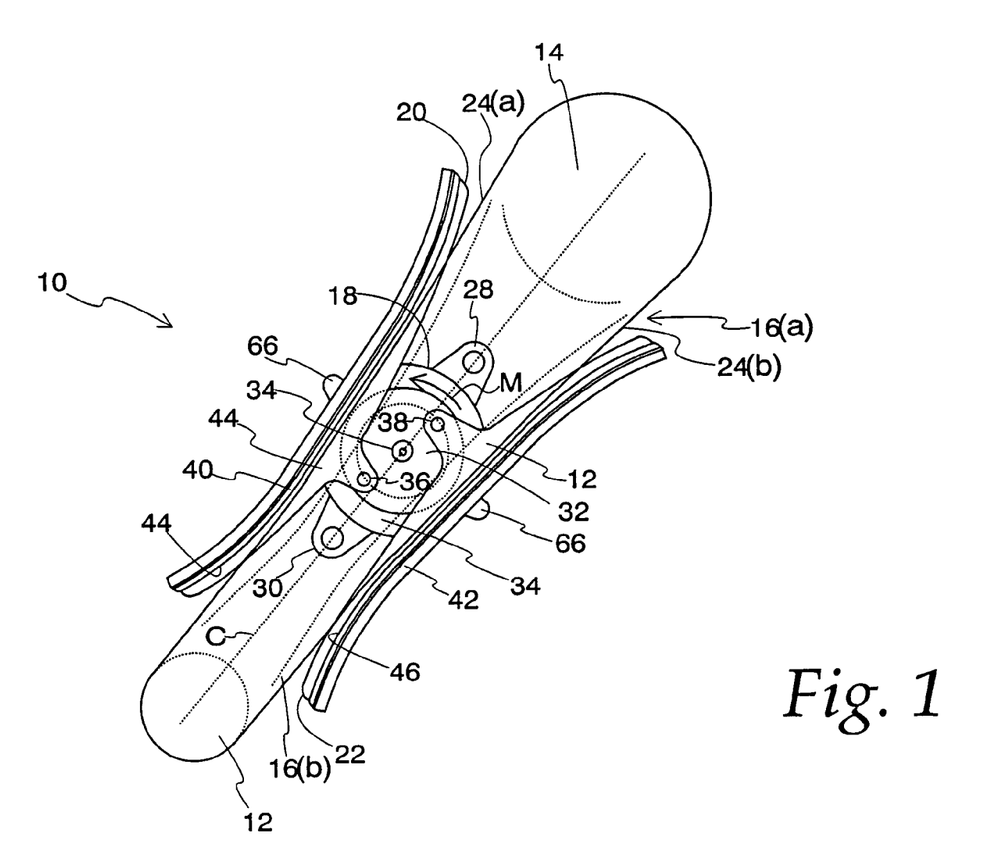
FIG. 1 is a front view of one aspect of the tensioner system of the present invention.

As shown in FIG. 1, an engine timing system 10 is represented generally by crankshaft sprocket 12 (the drive sprocket) and camshaft sprocket 14 (the driven sprocket). The path of a power transmission chain, i. e., a silent chain, roller chain or the like, is represented by broken chain line 16(a) and the path of the chain where the chain has become elongated as shown by the broken lines 16(b). One aspect of the rotary tensioner system of the present invention is shown with a rotary actuating tensioner 18 and two tensioner arms, 20 and 22.

In this aspect, the rotary actuating tensioner 18 is located between the strands of the chain 24(a) and 24(b) and between the two sprockets 12 and 14. The rotary actuator 18 is generally centered with respect to the center line C extending between the center of the drive sprocket 12 and the driven sprocket 14. The outer housing of the rotary actuating tensioner 18 possesses two mounting tabs 28 and 30 with mounting bores for attachment of the device to the engine block.

Figures 5, 6:
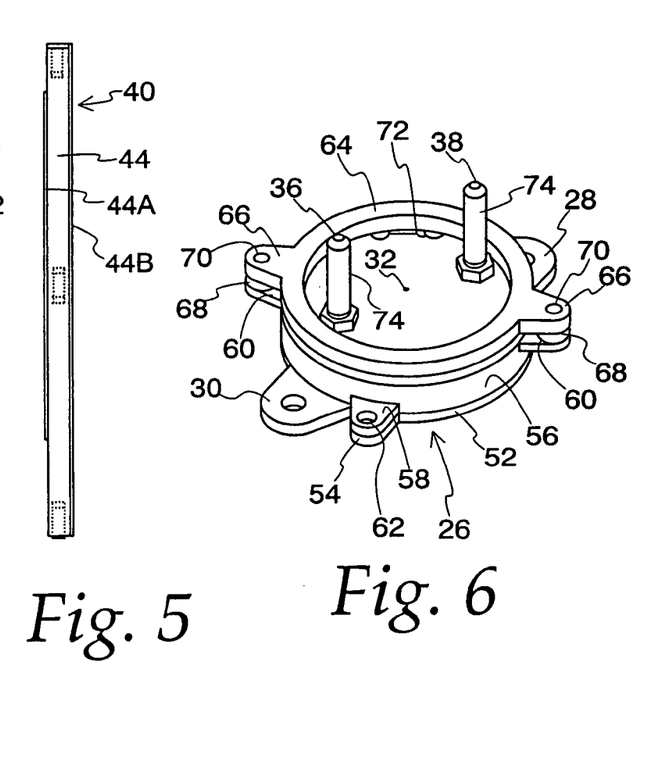
FIG. 5 is a second view of the shoe assembly for a tensioner arm shown in FIG. 4 rotated about 90°.
FIG. 6 is a perspective view of the rotary actuating tensioner from the system shown in FIG. 1, with the tensioner arms removed.

As shown in FIGS. 1 and 6, secured within the tensioner housing 26 is a rotary body 32 which is rotatable around a central pivot point 34. A first fixed pin 36 and a second fixed pin 38 are disposed near the periphery of the rotating body 32, on opposite sides of the pivot point 34. In this aspect, the first 36 and second 38 pins are located equidistant from the center of the pivot point 34.

The pins 36 and 38 may be disposed in other positions as may be needed for specific applications. As mentioned above, the pins 36 and 38, for example, may be positioned at different distances from the pivot point 34, or may be angularly offset, to impart different forces on the chain strands.

In the arrangement of FIGS. 1 and 6, the rotation of the rotary body about the pivot point 34 causes the fixed pins 36 and 38 to move equally in a counter clockwise direction, at an angular relation with respect to the center line C. When the pins 36 and 38 are located at differing distances from the pivot point 34, or are angularly offset, their relative movement with respect to the centerline C will differ and may be different for each pin relative to the other pin.

As shown in the aspect of FIG. 1, the installed rotary actuator 18 is positioned so that the first fixed pin 36 is positioned below the pivot point 34 and slightly to the left of the centerline C near the chain strand 24(*a*). The second fixed pin 38 is consequently positioned above the pivot point 34 and slightly to the right of the centerline C.

The rotary actuating tensioner 18 also carries a first tensioner arm 20 and a second tension arm 22 with attached shoes 40 and 42. The first arm 20 and second arm 22 are attached to the first fixed pin 36 and second fixed pin 38, respectively, forming rotating joints between the arms and the fixed pins. The first arm 20 extends outside the strand 24(*a*) of the chain and carries the shoe 40 with a wear face 44 positioned to contact the outside portion of the chain strand 24(*a*). The second arm 22 extends outside the strand 24(*b*) of the chain and carries the shoe 42 with a wear face 46 positioned to contact the outside portion of the chain strand 24(*b*).

In operation, when the rotating body 32 of the rotary actuating tensioner 18 moves counter clockwise (in this aspect), the fixed pins 36 and 38 pull the tensioner arms 20 and 22 and attached shoes 40 and 42 toward the chain centerline C and into contact with the outside portions of the chain strands 24(*a*) and 24(*b*). As the shoes 40 and 42 are positioned closer to the centerline C, the chain is squeezed or tightened from both sides along both strands 24(*a*) and 24(*b*), generally simultaneously. In this manner, this aspect of the tensioner system 10 will potentially provide twice the take up distance in a chain when compared to a conventional tensioner arm acting upon only one strand, for the same amount of relative actuator movement.

Additionally, the configuration of this aspect of the rotary actuating tensioner 18 provides superior dampening of chain vibration by eliminating the need for the previously discussed independent lever mechanisms and by coupling the two tensioner arms 20 and 22 directly to the rotary actuating tensioner 18. Thus, vibration in a first strand of chain, whether strand 24(*a*) or 24(*b*), is transferred and damped by the action of the second strand through the rotary actuating tensioner 18.

Figure 2:
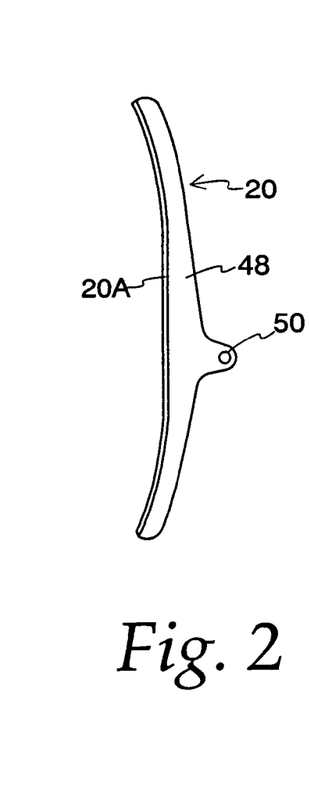
FIG. 2 is a side view of a tensioner arm from the system shown in FIG. 1.

Referring to the figures to describe the two principle parts of the rotary actuating tensioner 18 in greater detail, FIG. 2 depicts one aspect of a tensioner arm 20 in front view. The first and second arms (20 and 22 as shown in FIG. 1) are identical in structure but have a different orientation in operation, determined by the direction of chain travel. This aspect of the tensioner arm 20 has an elongated bracket portion 48 with a bore 50. The bore 50 is slightly offset toward the leading end of the bracket portion 48 of the tensioner arm 20. More particularly, the bore 50 is offset toward the end of the arm 20 nearest the incoming chain.

Figures 3, 4:
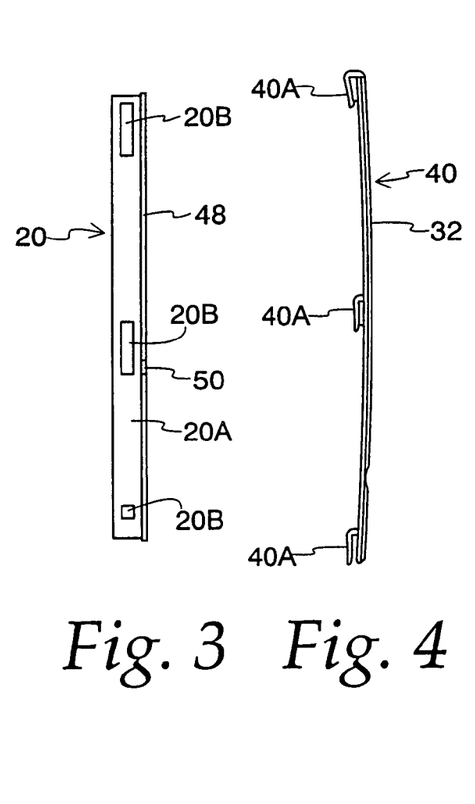
FIG. 3 is a second view of the tensioner arm shown in FIG. 2, rotated about 90°.
FIG. 4 is a side view of a shoe assembly for the tensioner arm shown in FIG. 2.

In this aspect, the tensioner arm 20 has a shoe attachment portion 20(*a*), also shown in FIG. 3, which is oriented perpendicular to the elongated bracket portion 48. The shoe attachment portion 20(*a*) has a lengthwise gradual curve to generally match an associated span of chain and a plurality of rectangular openings 20(*b*) to facilitate the attachment of a shoe 40 to the arm 20.

One aspect of the shoe portion 40 of the tensioner system is shown in FIGS. 4 and 5 (the shoe 40 typically is substantially the same as the shoe 42). The shoe 40 includes a plurality of clips 40(*a*) formed on a rear side of the shoe 40 which insert through the rectangular openings in the shoe attachment portion 20(*a*) of the tensioner arms 20. In particular, the clips 40(*a*) engages holes 20(*b*) shown in FIG. 3. Preferably, a clip 40(*a*) is formed at each end of the shoe and another clip is formed in an intermediate portion of the shoe. Opposite the rear side of the shoe 40 is a chain contacting wear face 44, preferably with a flat central face and raised edges 44(*a*) to form a channel through which the chain travels.

The aspect of the rotary actuating tensioner 18 shown in FIG. 1 is further illustrated in FIG. 6. The actuator housing 26 is comprised of a flat circular base 52 with a set of the above-mentioned mounting tabs 28 and 30 and a set of fastening tabs 54. Atop this base sits the ring body 56 which also may have two sets of tabs, 58 (see FIG. 10), which are flush to the bottom edge of the ring body 56 and the second set, tabs 60, which are flush to the upper edge of the ring body 56. Tab 58 align with tabs 54 of base 52. Each set of tabs has a bore 62 through which a fastening device such as a bolt or a rivet may be placed. The main body portion of this aspect is completed by the addition of the retainer ring 64. The retainer ring 64 also has a set of tabs 66 which align with tabs 60 of the ring body 56. Intercalated between these sets of tabs are bushings 68. Thus, each assembly consists of a bushing and two aligned tabs, as well as a common bore 70 through which a fastening device such as a bolt or rivet may be passed.

The rotary body 32 of the actuator is sized to fit closely within the ring body 56 forming a wholly or partially sealing engagement between the two body portions. The rotary body 32 also is sized to permit the rotational movement of the rotary body 32 within the ring body 56. A bearing surface 72 is disposed between the retainer ring 64 and the rotary body 32 to facilitate the movement of the rotary body 32 within ring body 56. Protruding upward from rotary body 32 are connector pins 36 and 38. In the preferred embodiment, these pins 36 and 38 are jacketed with bushings or sleeves 74 made of a wearable or self-lubricating material, such as plastic.

Figure 7:
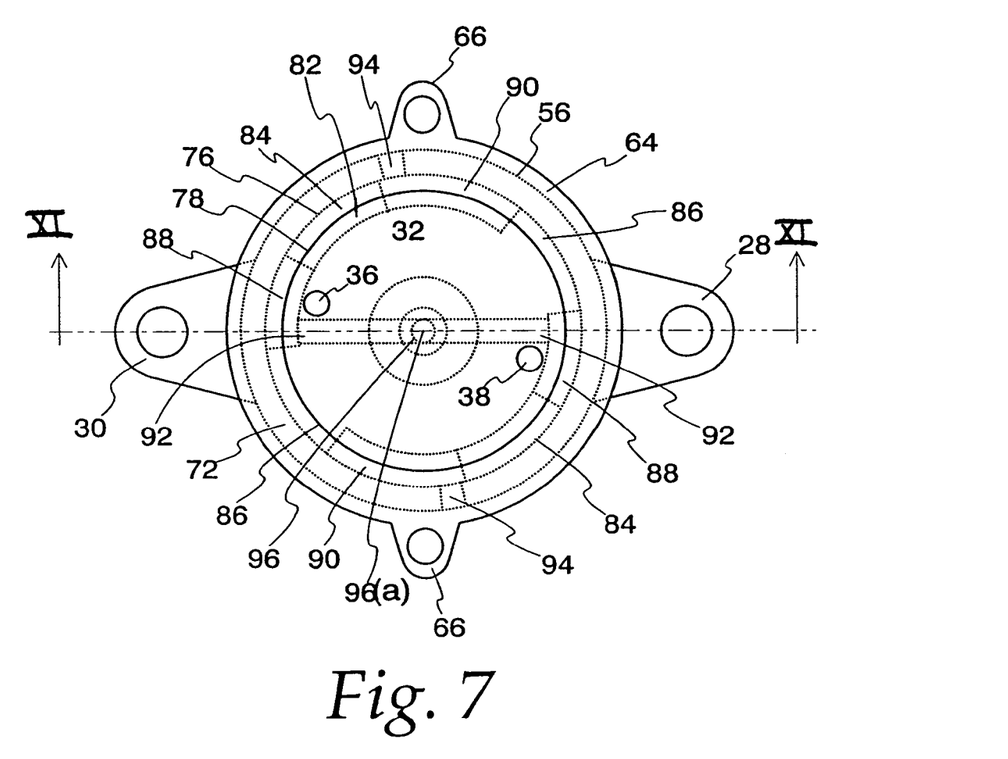
FIG. 7 is a partial top plan of the rotary actuating tensioner shown in FIG. 6.
Figure 8:
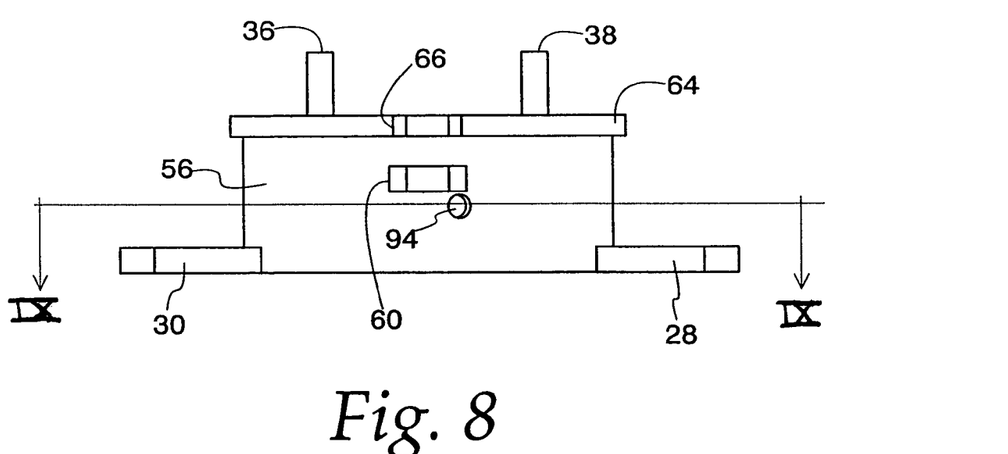
FIG. 8 is elevational view of the rotary actuating tensioner shown in FIG. 6.

The retainer ring 64 secures the rotary body 32 within the ring body 56. This also is shown in FIG. 7, where the retainer ring 64 is shown overhanging rotating body 32. As indicated in FIG. 7 by the dashed lines, the outer diameter 76 of rotating body 32 is greater than the inner diameter 78 of retainer ring 64. However, the inner diameter 78 of retainer ring 64 is not so small as to interfere with the symmetrically placed connector pins 36 and 38.

Figure 9:
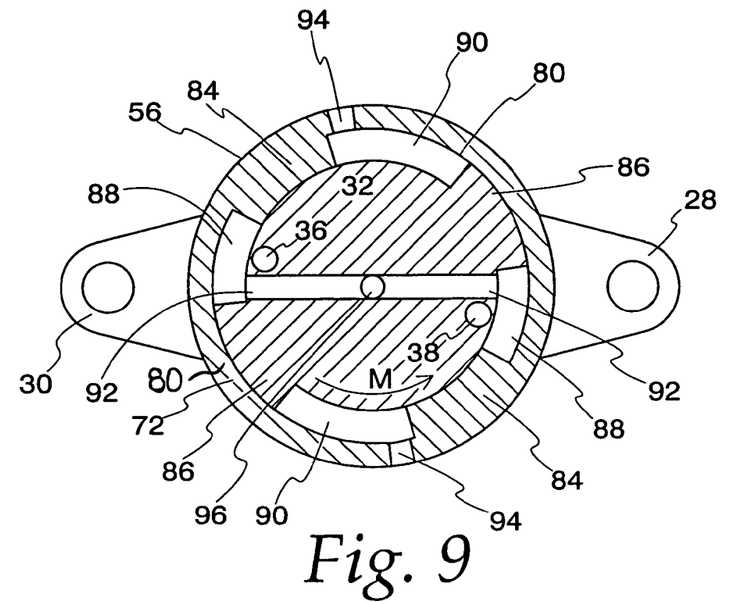
FIG. 9 is a sectional top view of the rotary actuating tensioner through the lines IX—IX shown in FIG. 8 indicating the rotary motion of the device and the fluid and air chambers of the tensioner.

Within rotary actuating tensioner housing 36 are inner chambers and channels within and formed between the assembled ring body 56 and rotary body 32. As shown in FIGS. 7 and 9, this aspect of the ring body 56 has two inner diameters, a first diameter defined by the wall sections 80 which is generally the same as the rotary body diameter 76. The ring body further is provided with a second, smaller diameter indicated by the dashed lines 82. The rotary body 32 similarly has a first diameter that is generally the same as the ring body diameter 82, as well as the diameter 76 defined by the wall sections 86 extending from the rotary body 32.

As indicated in FIGS. 7 and 9, the ring body wall section 84 is sized and positioned to engage the rotary body 32 and in a generally sealing or partially sealing relation. The rotary body wall 86 sections similarly are sized and positioned to engage the ring body walls 80 in a generally sealing or partially sealing relation. The ring body wall sections 84 and rotating body sections 86 further are sized to provide hydraulic chambers 88 and open chambers 90. The hydraulic chambers 88 are served by hydraulic lines 92. The open chambers 90 are provided with vents 94 through the ring body 56. As shown in FIG. 9, it is readily appreciated that as the chambers 88 are filled with fluid, the rotating body 32 rotates in reducing the size of the open chambers 90. Any air or other gases or fluids in the open chambers 90 are displaced through the vents 94.

The number of hydraulic chambers 88 will depend on the particular application, the hydraulic pressures required for the system, and the space permitted for the tensioner. The open chambers 90 also provide opportunities for substantial weight savings in the rotary body 32. Such open chambers are not required, and the number, size and use of open chambers will depend on the specific application for the tensioner.

Centrally located to the assembly is pivot pin 96. In the aspect shown in the Figures, pivots pin 96 contains a channel 96(a) for feeding hydraulic fluid into the rotary actuating tensioner 18, through the hydraulic lines 92 which feed chambers 88. In another aspect, the rotating body 32 can function without the pivot pin 96 where the hydraulic fluid is supplied to the high pressure chambers 88 through other conduit arrangements. Similarly, an alternative pivot elements also may be used depending on the application.

Figure 10:
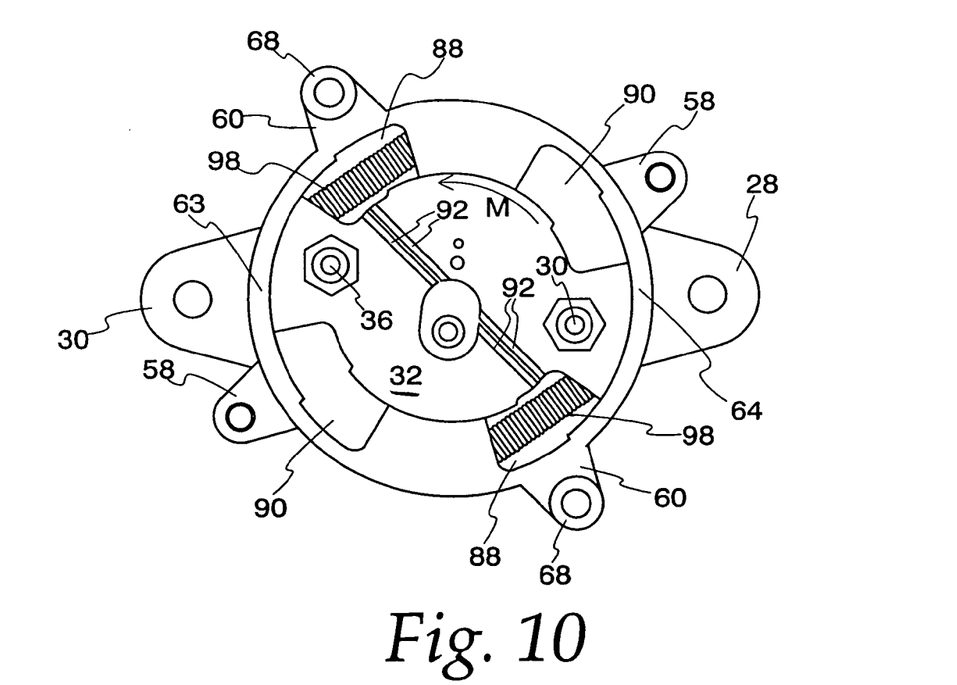
FIG. 10 is a sectional top plan view of rotary actuating tensioner shown in FIG. 6 indicating the fluid chambers having internal springs and the air chambers of the tensioner.

The rotational movement of rotary body 32 allows the tensioner system 28 to take up slack in the transmission chain strands. This rotational movement is facilitated by a pair of coil springs 98 located in the hydraulic chambers 88, as shown in FIG. 10. The springs 98 are orientated such that one end is seated on a rotary wall section 86 and the other end of the spring 98 is seated against a rotary body wall section 84 such that, in this aspect, the rotary body 32 is urged in a counterclockwise rotation (which also may be changed to a clockwise rotation by rearrangement of the springs and/or chambers). In operation, as force is exerted against the springs 98, they are compressed and when slack forms in the transmission chain, the pressure against the tensioners arms 20 and 22 permit the springs 98 and hydraulic chamber 88 to expand to urge the arms 20 and 22 against the chain reducing the slack in the chain, by the rotational movement of the actuator 18.

Figure 11:
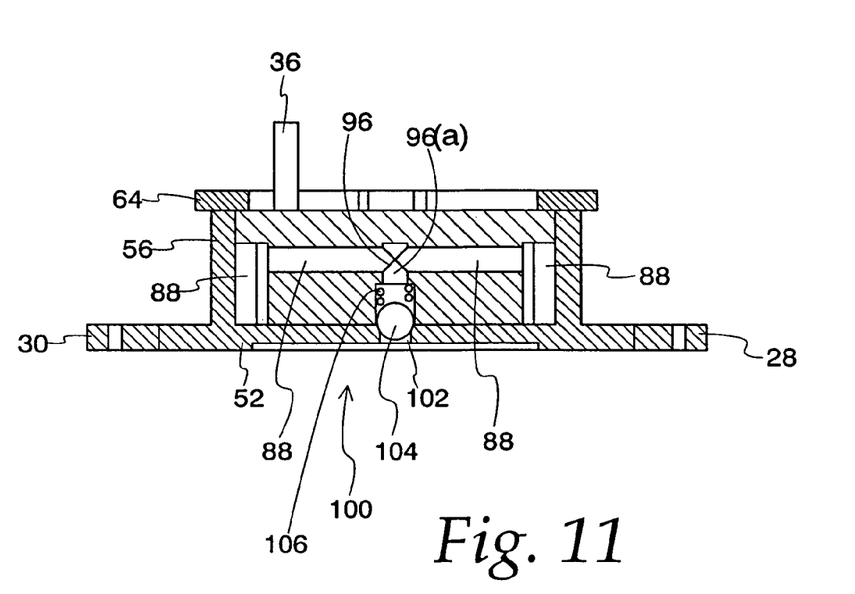
FIG. 11 is a view of the rotary actuating tensioner through line XI—XI of FIG. 7 showing the hydraulic fluid inlet and check valve assembly.

The springs 98 serve a second function in that by expanding the hydraulic chambers 88 and they facilitate the filling of the chambers 88 with hydraulic fluid. To restrict the flow of hydraulic fluid out of the hydraulic chambers 88, a check valve system is incorporated within the hydraulic system of the rotary actuating tensioner 18, and specifically in the rotary pin 96 in this aspect. An example of such a check valve system 10 is shown in FIG. 11. In this aspect, hydraulic fluid may enter the pin 96 through channel 102.

A stop flow ball 104 (or similar member) is biased against the opening to the channel 102 by the valve spring 106 to effectively seal the opening to the channel 102 and prevent the flow of hydraulic fluid out of the tensioner 18. When the hydraulic pressure within the tensioner 18 is reduced, for example by the rotation of the rotary body 32 and expansion of hydraulic chambers 88, the stop flow ball 104 is easily displaced allowing hydraulic fluid to flow into the tensioner 18 through the previously mentioned channel 96(a). As previously discussed, fluid entering through channel 102 may flow freely to chambers 88 via channels 96(a) and lines 92.

The unimpeded communication between the hydraulic chambers 88, the hydraulic channels 92 and the check valve 100 ensures that pressure alterations in the hydraulic chambers 88 are communicated throughout the device. The check valve 100 further prevents backflow of the hydraulic fluid from the tensioner 18, and the reversal of the direction of the movement of the rotary body 32 is resisted by the trapped fluid, effectively preventing the reverse rotation of the tensioner 18.

Thus, the springs and the hydraulic system act synergistically in providing and maintaining chain tensions. The springs 98 cause the tensioner to rotate to take up the initial slack in the chain. This allows the hydraulic system to function at a relatively low pressure, sufficient to allow the free flow of fluid into the expanding chambers 88. When vibrational forces from the chain work to cause pressure against rotary actuating tensioner 18, the hydraulic fluid filled chambers 88 and check valve system 100 resists the movement of the rotary body 32, rather than relying solely on the springs 88. Consequently, the rotary actuating tensioner 18 does not require excessive spring load as found in the prior tensioners.

By further promoting this movement of hydraulic fluid, the springs 98 allow the hydraulic system of the rotary actuating tensioner 18 to work at a lower pressure than would otherwise be needed if the hydraulic system were required to drive the rotary actuating tensioner 18. The mounting of springs 98 in chambers 88 has the additional advantage of lubricating the springs 98 with hydraulic fluid, preventing corrosion and extending the working life of the rotary actuating tensioner 18.

In other aspects of the assembly, the springs may be located in the open chamber 90, with a commensurate change in the dimensions, size, configuration and number of hydraulic chambers 88 and in hydraulic pressure used in the hydraulic chambers 88. Other spring types, in addition, may be used in the system, such as suitably adapted torsion springs.

The hydraulic aspect of the tensioner 18 is not a passive component of the present invention, as it permits the rotary body 32 to move in only one direction during operation. This unidirectional aspect is helpful in maintaining tension in the chain, maintaining the position of the chain strand, dampening chain vibration and prevent timing faults or other failures of the engine. As depicted in FIG. 10, this direction is counter clockwise M in the above-mentioned aspect of the tensioner system 18. Its direction may be reversed in other applications.

In one example, the actuating tensioner 18 may be used to replace a torsion spring rotary actuator for a power transmission chain system. In such systems, the prior, torsion spring actuators typically required torsion springs with a high spring force to impart the desired degree of position control of the chain. The rotary actuator 18, in one aspect, may be provided with hydraulic chambers 88 with dimensions and clearances sufficient to provide suitable chain tension and control of the position of the chain strand when supplied with hydraulic fluid pressures typical of an engine oiling system. The hydraulic leakage in the tensioner is controlled sufficiently to react against high chain loads while not imparting high loads on the chain as would be required by a non-hydraulic, spring tensioner.

It will be readily apparent to those skilled in the art that the above described aspect is but one possible application for the present rotating tensioner 18. Other aspects, modifications and embodiments employing the principles of this invention, particularly upon considering the foregoing teachings, also may be used in other applications.

For example, the design of the rotary tensioner 18 offers the ability to incorporate multiple connecting points for lever mechanisms driving chain contacts. As noted for the above aspect of the tensioner 18, contacts on multiple chains are advantageous because the amount of movement required from the tensioner to take up any resulting slack in the system is minimized. Moreover, deviation of the chain from its original path as slack is taken up also is minimized to prevent potential interference of the mechanism with other engine components, and to minimize stress on the chain itself by limiting movement between the links as the chain traverses its path.

Figure 12:
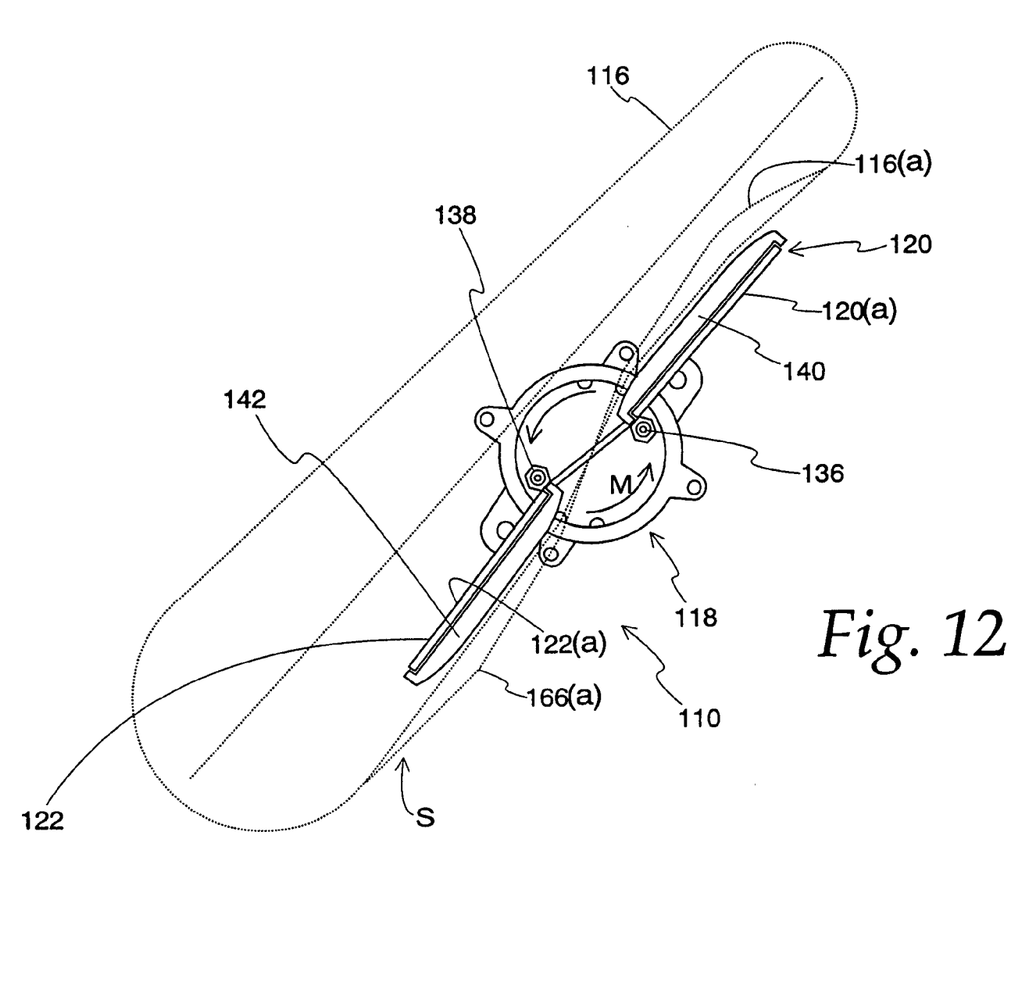
FIG. 12 is a front view of one aspect of the rotary tensioner system with dual tensioner arms directly attached to the rotary actuating tensioner, and contacting a single chain strand.

Similar advantages can be achieved by designs which make multiple contacts with a single chain strand. The aspect of the tensioner shown in FIG. 12 illustrates such a design where an alternative aspect of the rotary tensioner 118 is mounted midway along and centered beneath the chain path to allow the tensioner 118 two chain contacts on a slack strand without the use of a lever system. In FIG. 12, an engine timing system is represented generally as described for FIG. 1, above. The path of the power transmission chain is represented generally by broken line 116. The altered path of the chain due to wear is represented by broken lines 116(*a*). With rotary tensioner 118 mounted beneath the strand S, dual tensioner arms 120 and 122 can be secured directly to the rotary body tensioner 118.

The dual arms 120 and 122 extend in opposite directions from each other, roughly parallel to strand S. Each arm consists of an elongated shoe mount 120(*a*) and 122(*a*) carrying an attached shoe 140 and 142 which contacts strand S. Shoe 140 of first arm 120 contacts strand S from inside chain path 116, and shoe 142 of second arm 120 contacts strand S from outside chain path 116. The tensioner arms 120 and 122 of this aspect may be interconnected and attached to rotary actuating tensioner 118 via connector pins 136 and 138. This orientation allows simple rotation of rotary actuating tensioner 118 to maintain pressure on strand S at two points, minimizing chain path 116(*a*) deviation and the amount of tensioner movement required to impart tension in chain 116.

Figure 13:
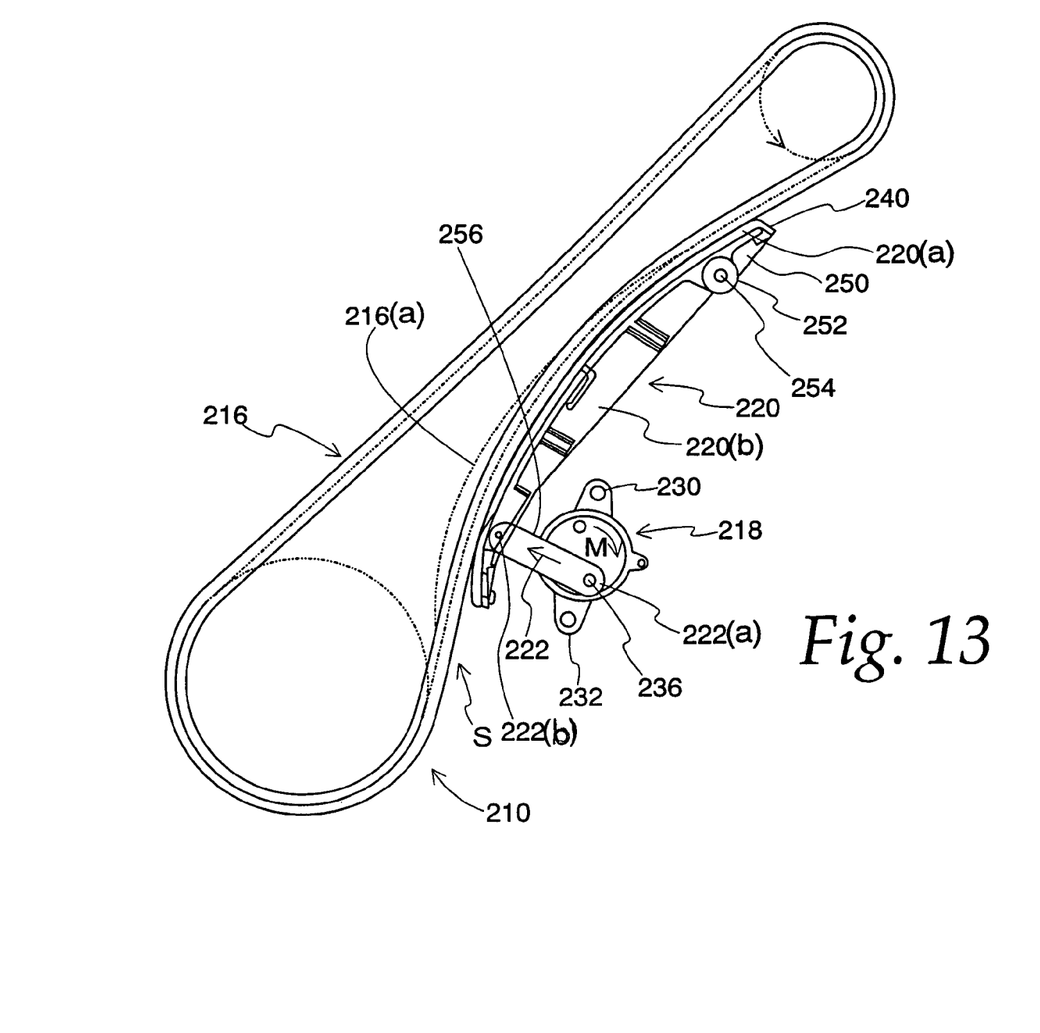
FIG. 13 is a front view of another aspect of the rotary tensioner system with a single tensioner arm contacting a single chain strand.
Figure 14:
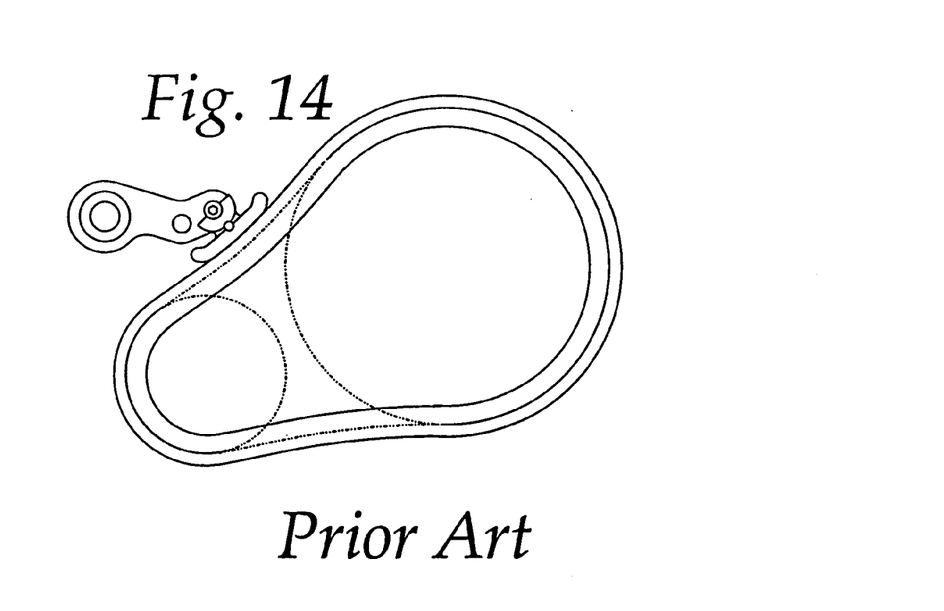
FIG. 14 is a front view of a prior art single arm torsion spring tensioner device.

In addition to supporting multiple chain contacts, the rotary actuating tensioner also can form part of another alternative tensioner systems. The aspect 210 shown in FIG. 13 illustrates an alternative, tensioner utilizing a pivoting arm. As in FIG. 12, an engine timing system is represented generally as described for FIG. 1. The path of the power transmission chain is represented generally by the triple line 216. The altered path of the chain due to wear is represented by the broken line 216(*a*). The tensioner system 210 of FIG. 13 is comprised of a rotary actuating tensioner 218, a lever mechanism 222 and a single tensioner arm 220. The rotary actuating tensioner 218 is as described above. The tensioner arm 220 is generally similar to the tensioner arm 20 described above for the aspect of the tensioner 18. The arm 220 has an elongated bracket portion 220(*b*) with a bore 250 set distally to one end. The bore 250 contains a bushing 252 and is fixed to a pin 254 located on the engine block such that the tensioner arm 220 lies in a generally parallel relation to the chain strand S. The arm 220 has a shoe attachment which is orientated perpendicular to the elongated bracket portion 220(*b*). The arm shoe attachment portion 220(*a*) has a lengthwise gradual cure to generally match the associated span of chain. The shoe attachment portion 220(*a*) carries a shoe 240 composed of a wear face material which contacts the chain as described for the shoe 40 mentioned above.

In this aspect, the rotary actuating tensioner 218 is located below the chain strands and the tensioner arm 220 and is mounted by tabs 230 and 232 to the engine block. The tensioner 218 communicates with the tensioner arm 220 via lever mechanism 222 which, in this aspect, is a rigid bar containing bore holes 222(*a*) and 222(*b*) at either end. The lever bore 222(*a*) is sized to accept the pin 236 of the tensioner arm 218 to form a pivoting connection. The lever base 222(*b*) similarly is sized to accept a pin 256 on the arm 220 to form a pivoting connection with the arm 220. As a result, when the tensioner rotates, as discussed above, in the direction M the tensioner urges the lever 222 towards the arm 220 to press the shoe 240 into the chain strand to increase the chain tension and remove slack from the chain.

While several embodiments of the invention have been illustrated, it will be understood that the invention is not limited to these embodiments.

What is claimed is:

1. A power transmission chain and tensioner for an automotive system application, said chain tensioner and power transmission chain system comprising:

a plurality of sprockets including at least one driving sprocket connected to a power input and at least one driven sprocket connected to a power output;

a chain wrapped around the plurality of sprockets, the chain including at least a first stand portion having some of links being pulled by the driving sprocket and a second strand portion having some links pulling the driven sprocket;

a hydraulic fluid source for the pressurized flow of hydraulic fluid;

a rotary actuating hydraulic tensioner having a stationary portion and a rotatable body in operative relation to the stationary portion, the rotatable body movable in a generally planar rotation about a central pivot point and in flow communication with the hydraulic fluid source and one or more springs disposed within said tensioner; and the rotatable body having an outer face provided with at least one tensioner arm operatively connected thereto, the tensioner arm having a friction surface positioned in contact with at least one of the chain strands to exert force on the strand, and the hydraulic fluid pressure and the one or more springs within the rotary tensioner effective to maintain the rotatable body in a position to hold the friction surface against the strand with sufficient force to provide tension in the chain.

2. The system of claim 1 wherein the rotatable body is biased by force against the rotatable body from the one or more springs to rotate about the central pivot in a first direction moving the tensioner arm friction surface against the chain strand and the hydraulic fluid provides biasing pressure within the rotary tensioner effective to resist the movement of the rotatable body in a reverse, second direction due to pressure against the tensioner arm by the strand.

3. The system of claim 2 wherein the spring force required to maintain the tensioner arm against the chain strand is less than the spring force required in a rotary tensioner system that does not utilize pressurized hydraulic fluid.

4. A rotary actuating hydraulic tensioner for maintaining a desired degree of tension in a chain system in an engine comprising:
   a stationary housing and a rotatable body disposed within the housing, the rotatable body movable about a central pivot point in a generally planar rotation and in a flow communication with a high pressure hydraulic fluid source;
   a first arm and a second arm opposite the first arm, each arm movably attached to pin assemblies fixed to the rotatable body;
   a first shoe disposed on the first arm to contact a slack strand of the chain, the first shoe disposed outside of the slack strand and positioned to receive the slack strand along a substantial length of the first shoe;
   a second shoe disposed on the second arm to contact a tight strand of the chain, the second shoe disposed outside the tight strand and positioned to received the tight strand along a substantial length of the second shoe;
   the rotatable body of the actuating hydraulic tensioner movable about the pivot point to urge the first and second shoes laterally inward, relative to the chain to impart tension to said chain.

5. The actuator of claim 4 wherein the first and second pin assemblies relative to the pivot point permitting the tensioner arms to adjust to movement of the chain strands along the shoes.

6. The actuator claim 4 wherein the first and second pin assemblies are in substantial alignment with the pivot point along a central axis extending through the pivot point.

7. The actuator of claim 6 wherein said first and second pin assemblies are equally spaced apart relative to the pivot point along the central axis.

8. The actuator of claim 4 wherein the first pin assembly is placed a first distance from the central axis and the second pin assembly is spaced a second distance from the central axis, the first distance being different from the second distance to move the tensioner arms different distances relative to the chain.

9. The actuator of claim 4 wherein the first arm is providing a first tensioning force and the second arm is providing with a second tensioning force, the first force being greater than the second force.

10. The actuator claim 9 wherein rotation of the rotatable body of the tensioner communicates linear force through the lever to the arm thereby imparting tension to at least a portion of the chain.

11. The power transmission chain and tensioner system of claim 4 wherein the rotary actuating hydraulic tensioner is located outside one strand of the chain, the tensioner is in communication with a single tensioner arm through a short lever; the lever is disposed upon one of the pin assemblies and is positioned at one extreme of the arm, the tensioner arm is provided with a fixed pivot pin at another extreme; and the tensioner arm is provided with a shoe disposed to contact and exert force against the chain to provide tension to the chain.

12. The rotary actuator of claim 4 wherein the first and second arms are extensions of the same rigid arm assembly; the arm assembly being disposed upon opposing rotating pin assemblies affixed to the face of the rotatable body of the tensioner, and with the arms rigidly disposed outward from the rotating body portion,
   a first shoe disposed on the first arm, the first shoe extending outside a slack strand of the chain, the slack strand of the chain running along a substantial length of the first shoe;
   a second shoe disposed on the second arm, the second shoe extending inside a slack strand of the chain, the slack strand of the chain running along a substantial length of the second shoe;
   the arms displaced from the axis of the rigid arm assembly by an angle sufficient to allow optimal contact of the shoes of the arm assembly with the slack strand of the chain assembly, each of the arms held at such an angle to the axis of the rigid arm assembly so as to retain each of the arms in parallel aspect in relation to the other arm.

13. The rotary actuator of claim 12 wherein the first and second rotating pin assemblies are each pivoted about a single point, the pivoting movement of the pin assemblies permitting the attached arm assemblies to adjust to movement of the chain strands along the shoes, thereby creating tension in the chain assembly, and causing the slack strand to traverse a serpentine path.

14. A power transmission chain and tensioner for an automotive system application, said chain tensioner and power transmission chain system comprising:
   a plurality of sprockets including at least one driving sprocket connected to a power input and at least one driven sprocket connected to a power output;
   a chain wrapped around the plurality of sprockets, the chain including at least a first stand portion having some of links being pulled by the driving sprocket and a second strand portion having some links pulling the driven sprocket;
   a source for the pressurized flow of the hydraulic fluid; a rotary actuating hydraulic tensioner having a stationary portion and a rotatable body in operative relation to the stationary portion, the rotatable body movable about a central pivot point and in flow communication with the hydraulic fluid source;
   the rotatable body having an outer face provided with at least one tensioner arm operatively connected thereto, the tensioner arm having a friction surface positioned in contact with at least one of the chain strands to exert force on the strand, and the hydraulic fluid pressure within the rotary tensioner effective to maintain the rotatable body in a position to hold the friction surface against the strand with sufficient force to provide tension in the chain;
   one or more springs having a spring force for biasing the rotatable body to rotate about the central pivot in first direction moving the tensioner arm friction surface against the chain strand, the hydraulic fluid providing biasing pressure within the rotary tensioner effective to resist the movement of the rotatable body in a reverse, second direction due to pressure against the tensioner arm by the strand;
   a central pivot firmly affixed to the stationary portion of the tensioner, the rotatable body being mounted on the pivot within the stationary portion, and the stationary portion having inner surfaces cooperating with surfaces of the rotatable body to form at least one first chamber for receiving the pressurized hydraulic fluid therein, and the rotatable body being provided with abutment surfaces disposed to receive biasing force from the springs and the hydraulic fluid; and cooperating surfaces of the stationary portion and the rotatable body forming at least one second chamber vented to the ambient atmosphere, the venting being sized to permit reversible flow of air and other fluids from the second chamber with the movement of rotatable body around the pivot point.

15. The system of claim 14 wherein the springs are disposed in the at least one second chamber and the rotary actuating hydraulic tensioner is provided with a valve limiting the loss of hydraulic fluid from the first chamber.

16. A rotary actuating hydraulic tensioner for maintaining a desired degree of tension in a chain system in an engine comprising, a stationary housing and a rotatable body disposed within the housing, the rotatable body movable about a central pivot point and in flow communication with pressurized hydraulic fluid from a pressurized hydraulic fluid source;

at least one first chamber within the tensioner for receiving the pressurized hydraulic fluid, the first chamber disposed to move the rotatable body about the pivot point when pressurized by the hydraulic fluid;

at least one tensioner arm operatively connected to the rotatable body with at least one frictional contact surface positioned to contact at least a portion of the chain to exert force on the chain when the rotatable body is moved in a first direction relative to the tensioner arm, the hydraulic fluid within the first chamber generally being retained within the first chamber to resist the movement of the rotatable body in a second reverse direction when force is exerted against the tensioner arm contact surface by the chain;

at least one spring disposed within the first chamber to bias the rotatable body in the first direction and to position the tensioner arm contact surface against the chain;

a valve of the tensioner effective to maintain the hydraulic pressure within the first chamber; and at least one second chamber of the tensioner vented to the ambient atmosphere and positioned to evacuate air or other fluids from the second chamber within the rotatable body is moved in the first direction.

17. A rotary actuating hydraulic tensioner for maintaining a desired degree of tension in a chain system in an engine comprising, a stationary housing and a rotatable body disposed within the housing, the rotatable body movable about a central pivot point and in flow communication with pressurized hydraulic fluid from a pressurized hydraulic fluid source;

at least one first chamber within the tensioner for receiving the pressurized hydraulic fluid, the first chamber disposed to move the rotatable body about the pivot point when pressurized by the hydraulic fluid;

at least one tensioner arm operatively connected to the rotatable body with at least one frictional contact surface positioned to contact at least a portion of the chain to exert force on the chain when the rotatable body is moved in a first direction relative to the tensioner arm, the hydraulic fluid within the first chamber generally being retained within the first chamber to resist the movement of the rotatable body in a second reverse direction when force is exerted against the tensioner arm contact surface by the chain;

a valve of the tensioner effective to maintain the hydraulic pressure within the first chamber; and at least one second chamber of the tensioner vented to the ambient atmosphere and positioned to evacuate air or other fluids from the second chamber within the rotatable body is moved in the first direction.

18. A rotary actuating hydraulic tensioner for maintaining a desired degree of tension in a chain system in an engine comprising:

a stationary housing and a rotatable body disposed within the housing, the rotatable body movable about a central pivot point and in a flow communication with a high pressure hydraulic fluid source;

a first arm and a second arm opposite the first arm, each arm movably attached to pin assemblies fixed to the rotatable body, the first and second pin assemblies being in substantial alignment relative to the pivot point along a central axis extending through the pivot point, the first pin assembly being spaced a first distance from the central axis and the second pin assembly being spaced a second distance from the central axis, the first distance being different from the second distance to move the tensioner arms different distances relative to the chain;

a first shoe disposed on the first arm to contact a slack strand of the chain, the first shoe disposed outside of the slack strand and positioned to receive the slack strand along a substantial length of the first shoe;

a second shoe disposed on the second arm to contact a tight strand of the chain, the second shoe disposed outside the tight strand and positioned to received the tight strand along a substantial length of the second shoe;

the rotatable body of the actuating hydraulic tensioner movable about the pivot point to urge the first and second shoes laterally inward, relative to the chain to impart tension to said chain.

19. A rotary actuating hydraulic tensioner for maintaining a desired degree of tension in a chain system in an engine comprising, a stationary housing and a rotatable body disposed within the housing, the rotatable body movable about a central pivot point and in flow communication with a pressurized hydraulic fluid source;

at least one first chamber within the tensioner for receiving the pressurized hydraulic fluid, said first chamber disposed to move the rotatable body about the pivot point in a generally planar rotation when pressurized by the hydraulic fluid; at least one spring disposed within the chamber to bias the rotatable body in a first direction; and at least one tensioner arm operatively connected to the rotatable body with at least one frictional contact surface positioned to contact at least a portion of the chain to exert force on the chain when the rotatable body is moved in the first direction.

20. The rotary actuating hydraulic tensioner of claim 19 wherein the hydraulic fluid within the first chamber is generally retained within the first chamber to resist the movement of the rotatable body in a second reverse direction when force is exerted against the tensioner arm contact surface by the chain.

21. The rotary tensioner of claim 20 wherein the tensioner is provided with a valve effective to maintain the hydraulic pressure within the first chamber.

22. The rotary tensioner of claim 20 wherein the tensioner is provided with at least one second chamber vented to the ambient atmosphere and positioned to evacuate air or other fluids from the second chamber within the rotatable body is moved in the first direction.

23. The rotary tensioner of claim 20 wherein said rotary actuating hydraulic tensioner is positioned between a tight strand and a slack strand of the chain.

24. A power transmission chain and tensioner for an automotive system application, said chain tensioner and power transmission chain system comprising:
   a plurality of sprockets including at least one driving sprocket connected to a power input and at least one driven sprocket connected to a power output;
   a chain wrapped around the plurality of sprockets, the chain including at least a first stand portion having some of links being pulled by the driving sprocket and a second strand portion having some links pulling the driven sprocket;
   a hydraulic fluid source for the pressurized flow of hydraulic fluid;
   a rotary actuating hydraulic tensioner having a stationary portion and a rotatable body in operative relation to the stationary portion, the rotatable body movable in a generally planar rotation about a central pivot point and in flow communication with the hydraulic fluid source and one or more springs disposed within said tensioner; and
   the rotatable body having an outer face provided with at least one tensioner arm operatively connected thereto, the tensioner arm having a friction surface positioned in contact with at least one of the chain strands to exert force on the strand, and the hydraulic fluid pressure and spring bias within the rotary tensioner effective to maintain the rotatable body in a position to hold the friction surface against the strand with sufficient force to provide tension in the chain;
   the rotatable body being biased by force from the one or more springs to rotate about the central pivot in a first direction moving the tensioner arm friction surface against the chain strand and the hydraulic fluid provides biasing pressure within the rotary tensioner effective to resist the movement of the rotatable body in a reverse, second direction due to pressure against the tensioner arm by the strand;
   wherein the stationary portion of the tensioner includes a central pivot firmly affixed to said stationary portion, the rotatable body is mounted on the pivot within the stationary portion, and the stationary portion has inner surfaces cooperating with surfaces of the rotatable body to form at least one first chamber for receiving the pressurized hydraulic fluid therein, and the rotatable body is provided with abutment surfaces disposed to receive biasing force from one or more of the springs and the hydraulic fluid.

25. The system of claim 24 wherein the stationary portion and the rotatable body are provided with cooperating surfaces forming at least one second chamber vented to the ambient atmosphere, the venting sized to permit a reversible flow of air and other fluids from the second chamber with the movement of rotatable body around the pivot point.

26. The system of claim 24 wherein at least one of the springs and the pressurized hydraulic fluid are disposed within at least one said first chambers; the rotary tensioner is provided with a valve limiting the loss of hydraulic fluid from said chamber; and the surfaces of the stationary portion and the rotatable body are generally in sealing relation adjacent to said first chamber effective to limit the loss of hydraulic fluid from said chamber.

27. The system of claim 25 wherein at least one of the springs is disposed in at least one second chamber and the rotary tensioner is provided with a valve limiting the loss of hydraulic fluid from the first chamber.

* * * * *